US012643747B2

(12) United States Patent
Lin et al.

(10) Patent No.: US 12,643,747 B2
(45) Date of Patent: Jun. 2, 2026

(54) AUTOMATIC PICK-AND-PLACE SYSTEM

(71) Applicant: Delta Electronics, Inc., Taoyuan City (TW)

(72) Inventors: Chien-Ta Lin, Taoyuan City (TW); Jie-Shiou Tsai, Taoyuan City (TW); Po-Yu Chen, Taoyuan City (TW); Jian-Jang Lai, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 154 days.

(21) Appl. No.: 18/459,984

(22) Filed: Sep. 1, 2023

(65) Prior Publication Data

US 2024/0317511 A1 Sep. 26, 2024

(30) Foreign Application Priority Data

Mar. 20, 2023 (CN) .......................... 202310267881.2

(51) Int. Cl.
*B65G 47/90* (2006.01)
*B65G 61/00* (2006.01)

(52) U.S. Cl.
CPC ........... *B65G 47/904* (2013.01); *B65G 61/00* (2013.01)

(58) Field of Classification Search
None
See application file for complete search history.

(56) References Cited

U.S. PATENT DOCUMENTS 4,922,434 A * 5/1990 Fule ................... G05B 19/4083
901/45
5,456,001 A * 10/1995 Mori .................... H05K 13/021
29/721

5,491,888 A * 2/1996 Sakurai ................ H05K 13/041
29/832
5,743,005 A * 4/1998 Nakao ................ H05K 13/0812
29/721
5,894,657 A * 4/1999 Kanayama ......... H05K 13/0411
29/721
8,578,595 B2 * 11/2013 Kodama ................ H05K 3/305
29/739
10,969,761 B2 * 4/2021 Matsumoto .......... H05K 13/021

FOREIGN PATENT DOCUMENTS

| CN | 103625920 A | 3/2014 |
|---|---|---|
| CN | 111890109 A | 11/2020 |
| CN | 114423175 A | 4/2022 |
| CN | 218082753 U | 12/2022 |
| WO | WO2016175159 A1 | 11/2016 |

OTHER PUBLICATIONS

Taiwan Office Action and Search Report dated Jul. 31, 2023 in application No. 112110142; pp. 1-3.

* cited by examiner

*Primary Examiner* — Kavel Singh
(74) *Attorney, Agent, or Firm* — MUNCY, GEISSLER, OLDS & LOWE, P.C.

(57) ABSTRACT

An automatic pick-and-place system is provided, including a feeding device, a visual pattern formed on a fixed part of the feeding device, a manipulator, and a processing unit. An electronic component can be held between the fixed part and a gripping part of the feeding device. A visual module on the manipulator captures an image of the visual pattern, and the processing unit calculates the coordinate value of the electronic component. Thus, the manipulator can move to the target position and pick up the electronic element according to the coordinate value.

16 Claims, 7 Drawing Sheets

100

10

10

AUTOMATIC PICK-AND-PLACE SYSTEM

CROSS REFERENCE TO RELATED APPLICATIONS

This Application claims priority of China Patent Application No. 202310267881.2, filed on Mar. 20, 2023, the entirety of which is incorporated by reference herein.

BACKGROUND OF THE INVENTION

Field of the Invention

The present invention relates to automatic pick-and-place system, and, in particular, to an automatic pick-and-place system capable of automatic calibration.

Description of the Related Art

A manual teach-and-learn procedure usually needs to be executed after an automatic insertion machine is set up, whereby the robot manipulator can move to a target position to pick up the work piece.

Since the precision of conventional teach-and-learn procedures is greatly influenced by the operator's experience and technical competence, the calibration of the automatic insertion machine may be imprecise and unstable. Additionally, the conventional teach-and-learn procedure is also time-consuming and increases the production cost.

For the reasons described above, to address the problems of the conventional teach-and-learn procedure of the automatic insertion machine has become a challenge.

BRIEF SUMMARY OF THE INVENTION

An embodiment of the present invention provides an automatic pick-and-place system that includes a feeding device, a visual pattern, a manipulator, and a processing unit. The feeding device is configured to move a tape and a plurality of electronic components disposed on the tape, wherein the feeding device has a base and a clamping unit disposed on the base, and the clamping unit includes a main body, a fixed part, and a gripping part. The fixed part is mounted on the main body, and the gripping part is movably disposed on the main body. When the tape and one of the electronic components move to a predetermined position, the gripping part slides relative to the main body so that the electronic component is positioned between the gripping part and the fixed part.

The visual pattern is formed on the fixed part, and the manipulator has a visual module and a tooling module. The processing unit is electrically connected to the visual module. The visual module captures an image of the visual pattern on the fixed part and transmits the image to the processing unit. The processing unit calculates a coordinate value of the electronic component according to the image. The manipulator moves to a target position according to the coordinate value, and the tooling module then picks up the electronic component.

Specifically, the visual pattern includes a first reference feature, a second reference feature, and a third reference feature, a first datum axis extends through the first reference feature and the second reference feature, and a second datum axis extends through the first reference feature and the third reference feature.

In some embodiments, when the electronic component is held between the gripping part and the fixed part, the electronic component contacts an edge of the fixed part, and the first datum axis is parallel to the edge.

In some embodiments, the second datum axis is perpendicular to the edge.

In some embodiments, a first distance is formed between the first datum axis and the edge of the fixed part, and a second distance is formed between the edge of the fixed part and the center of the electronic component. The processing unit calculates the coordinate value of the electronic component based on the image and the first and second distances.

In some embodiments, the first datum axis is perpendicular to the second datum axis.

In some embodiments, the second datum axis extends through the center of the electronic component.

In some embodiments, the first, second, and third reference features are blind holes formed on a top surface of the fixed part.

In some embodiments, the first, second, and third reference features have a round, triangular, or polygonal shape.

In some embodiments, the feeding device is a vertical tape feeder.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
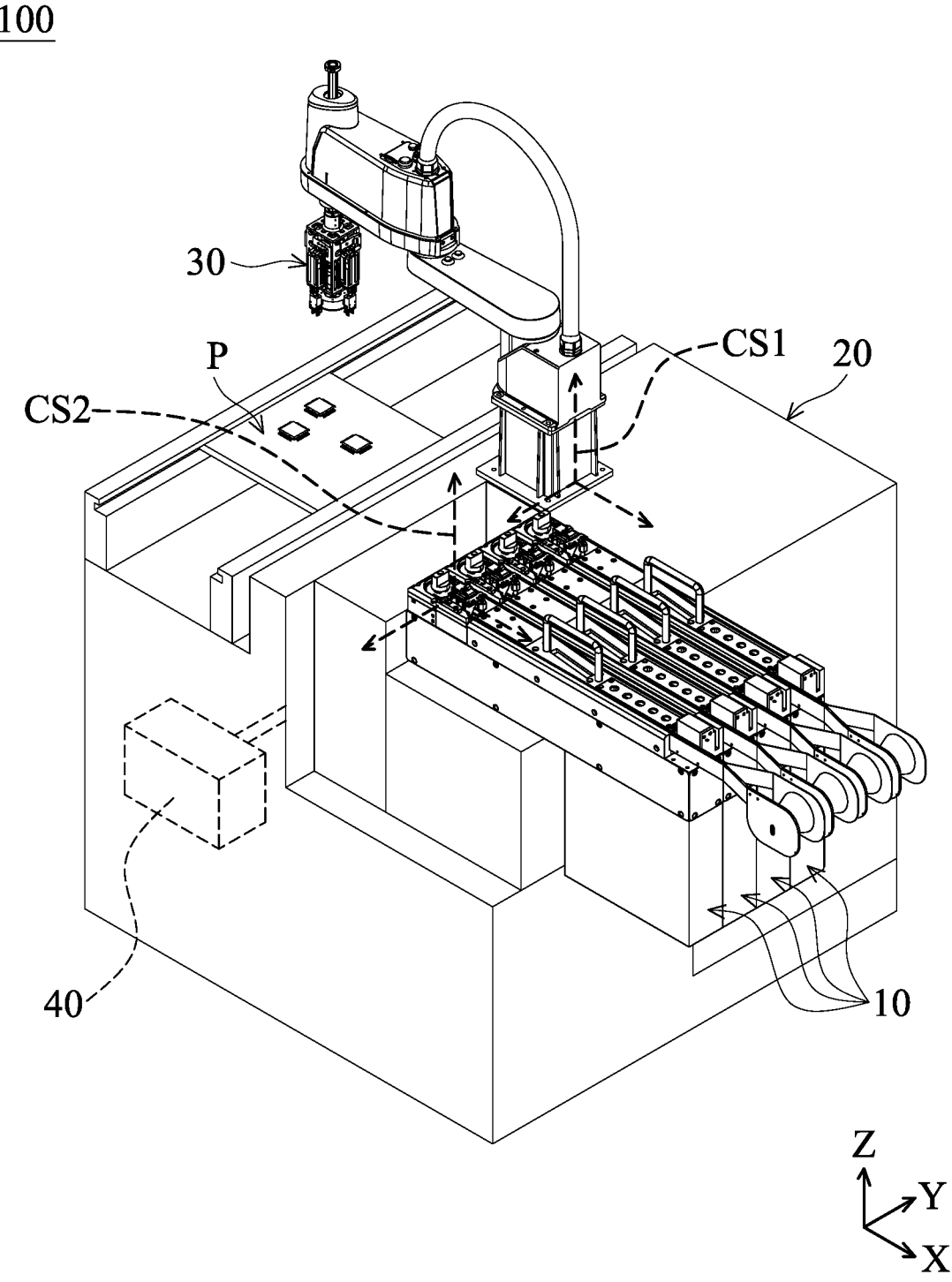
FIG. 1 is a perspective diagram of an automatic pick-and-place system 100 in accordance with an embodiment of the invention.

FIG. 1 is a perspective diagram of an automatic pick-and-place system 100 in accordance with an embodiment of the invention.

Referring to FIG. 1, an embodiment of the automatic pick-and-place system 100 may be used in an automatic insertion machine. The automatic pick-and-place system 100 primarily includes at least a feeding device 10, a base 20, a manipulator 30, and a processing unit 40 that is electrically connected to the feeding device 10 and the manipulator 30. The feeding device 10 and the manipulator 30 are disposed on the base 20, and the processing unit 40 is accommodated in the base 20.

During operation of the automatic pick-and-place system 100, an electronic component on a tape may be moved to a predetermined position by the feeding device 10, and the electronic component is then picked up and inserted into a circuit board P on the base 20 by the manipulator 30, thereby accomplishing the automatic insertion procedure.

For example, the feeding device 10 may comprise a vertical tape feeder. As shown in FIG. 1, the manipulator 30 defines a first coordinate system CS1, and the feeding device 10 has a clamping unit 13 (FIGS. 2-5) that defines a second coordinate system CS2, wherein the first and second coordinate systems CS1 and CS2 are located in different positions of three-dimensional space.

Figure 2:
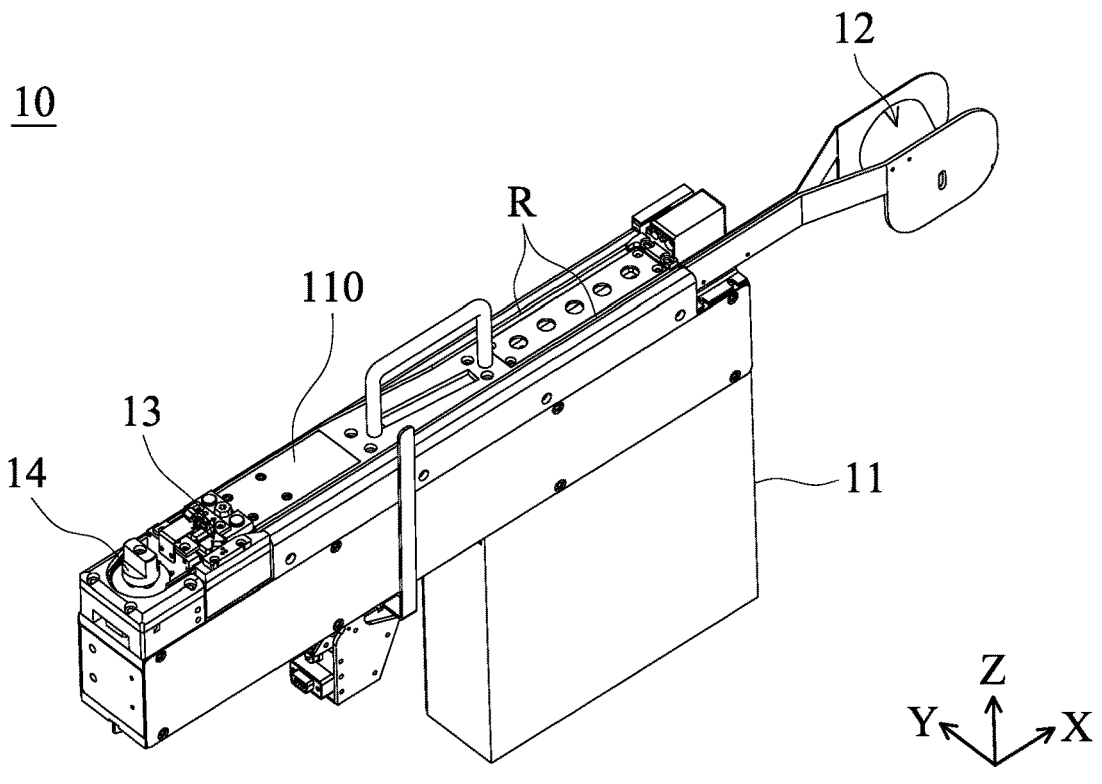
FIG. 2 is a perspective diagram of the feeding device 10 in FIG. 1.
Figure 3:
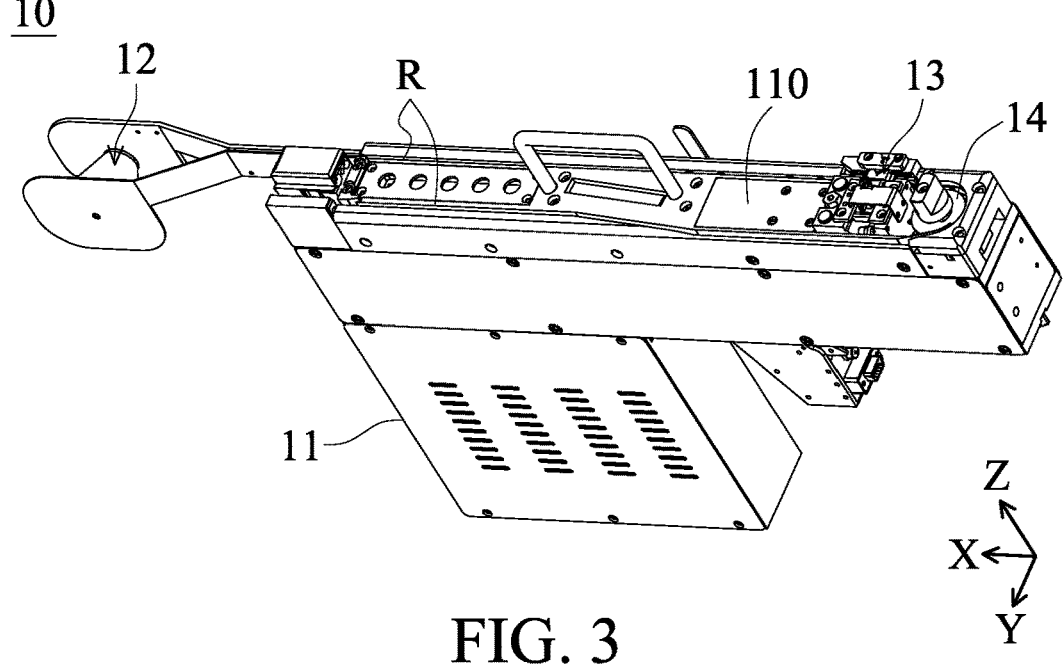
FIG. 3 is another perspective diagram of the feeding device 10 in FIG. 1.
Figure 4:
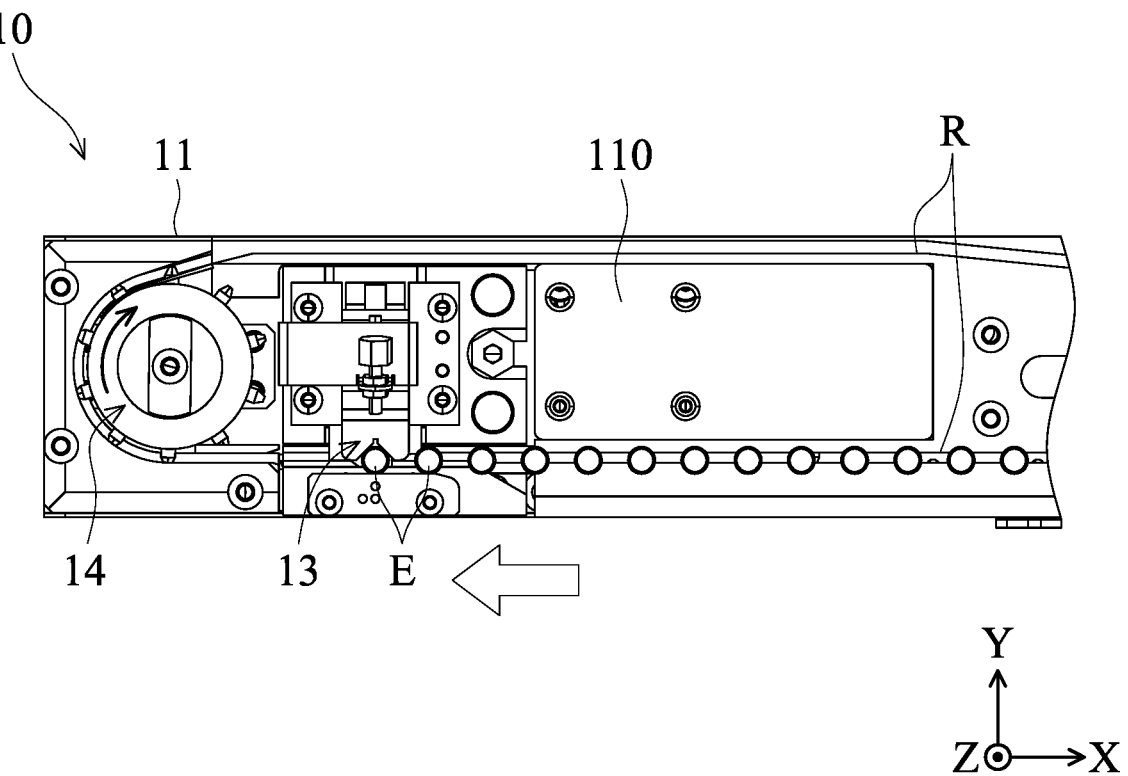
FIG. 4 is a top view of the driving mechanism 14 of the feeding device 10 when rotating and impelling the tape along the rail R.

FIG. 2 is a perspective diagram of the feeding device 10 in FIG. 1. FIG. 3 is another perspective diagram of the feeding device 10 in FIG. 1. FIG. 4 is a top view of the driving mechanism 14 of the feeding device 10 when rotating and impelling the tape along the rail R.

As shown in FIGS. 2-4, the feeding device 10 in this embodiment primarily has a chassis 11, a shaft 12, a clamping unit 13, a driving mechanism 14, and a lid 110. The shaft 12, the clamping unit 13, and the driving mechanism 14 are disposed on the chassis 11, and the lid 110 covers the top side of chassis 11 to protect the components inside the chassis 11.

When the automatic pick-and-place system 100 is in use, a part of the tape (not shown) is wound on the shaft 12, and the other part of the tape is received in a U-shaped rail R on the top side of the feeding device 10, wherein the teeth of a wheel gear inside the driving mechanism 14 are engaged through the holes on the tape.

As the arrow indicates in FIG. 4, when the tape is impelled by the driving mechanism 14 along the U-shaped rail R, the electronic components E (e.g. passive components) protruding from the top edge of the tape are moved to a predetermined position of the clamping unit 13 one by one along the –X direction. It should be noted that the clamping unit 13 is configured to hold the electronic components E, and the electronic component E may be cut using a cutting tool inside the clamping unit 13. Subsequently, the electronic component E may be picked up and inserted into the circuit board P on the base 20 (FIG. 1) by the manipulator 30.

Figure 5:
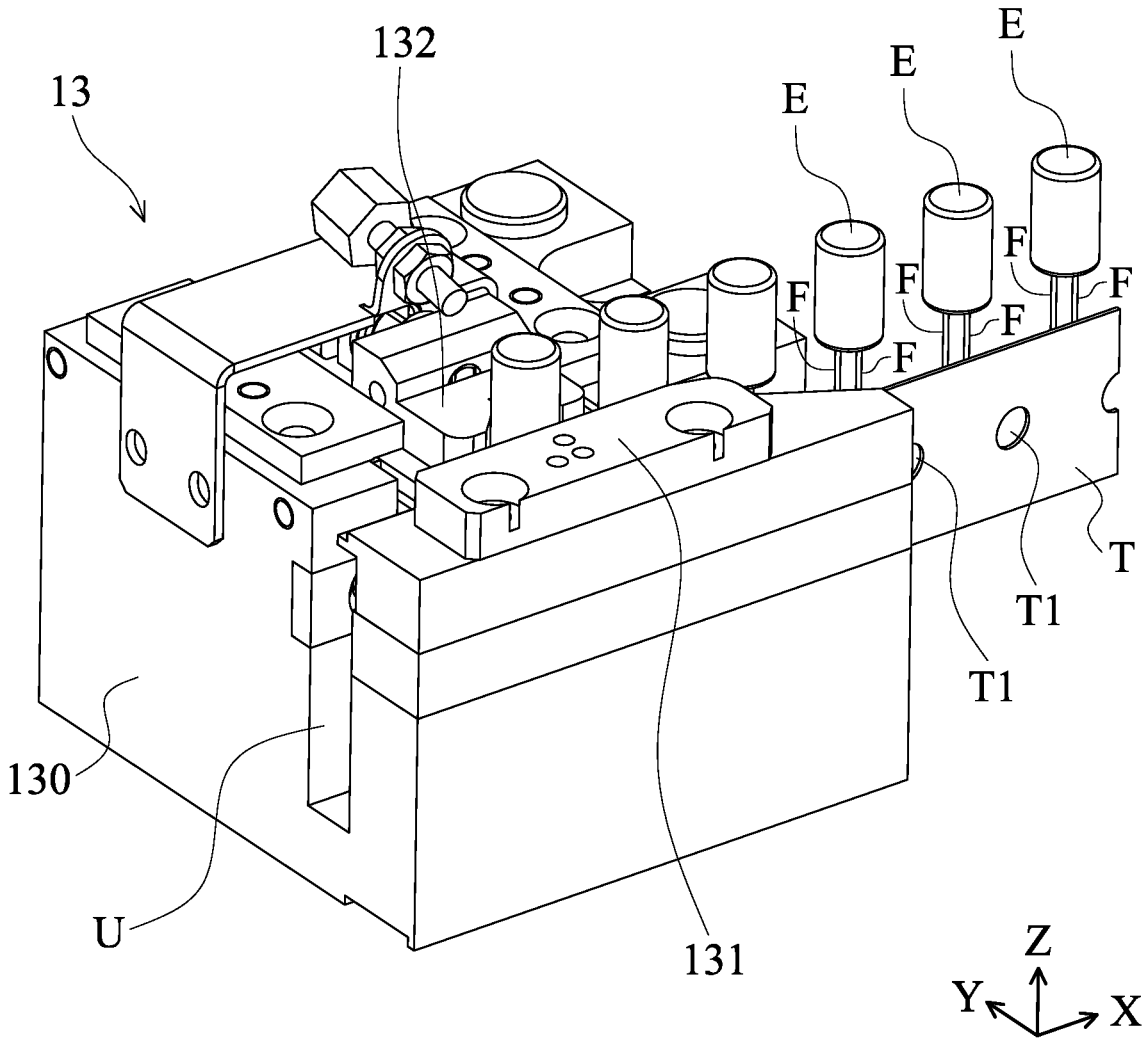
FIG. 5 is a perspective diagram showing one of the electronic components E on the tape T when moved to a predetermined position of the clamping unit 13 along the –X direction.

FIG. 5 is a perspective diagram showing one of the electronic components E on the tape T when moved to a predetermined position of the clamping unit 13 along the –X direction.

As shown in FIG. 5, each of the electronic components E is connected to the tape T via two legs F. In this embodiment, the teeth of a wheel gear inside the driving mechanism 14 (FIG. 4) are engaged through the holes T1 on the tape T, and when the wheel gear of the driving mechanism 14 rotates, one of the electronic components E is moved with the tape T along the rail R to a recess U (predetermined position) of the clamping unit 13, wherein the recess U is communicated with the rail R.

The clamping unit 13 primarily has a main body 130, a fixed part 131, and a gripping part 132. The main body 130 is affixed to the chassis 11, the fixed part is mounted on the main body 130, and the gripping part 132 is disposed on the main body 130 and movable relative to the main body 130 in the Y direction (horizontal direction).

When one of the electronic components E is moved with the tape T to the predetermined position, the gripping part 132 moves toward the fixed part 131, whereby the electronic component E and the legs F thereof are positioned between the gripping part 132 and the fixed part 131. Subsequently, a cutting tool (not shown) under the gripping part 132 may cut the legs F to separate the electronic component E from the tape T. The manipulator 30 then picks up and inserts the electronic component E into the circuit board P on the base 20 (FIG. 1), whereby the automatic insertion procedure is accomplished.

Figure 6:
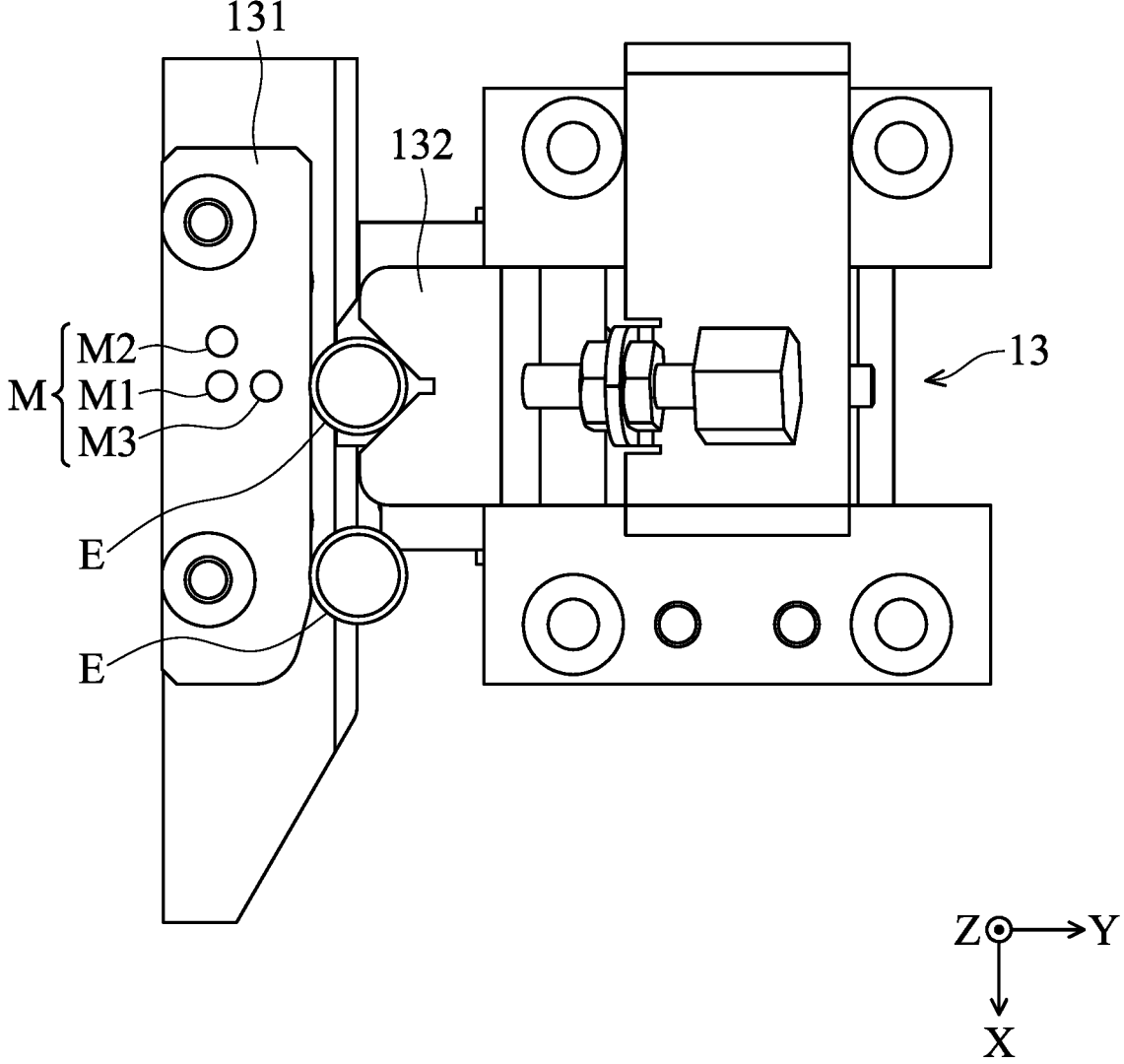
FIG. 6 is a top view of the clamping unit 13 with a visual pattern M formed on the fixed part 131.
Figure 7:
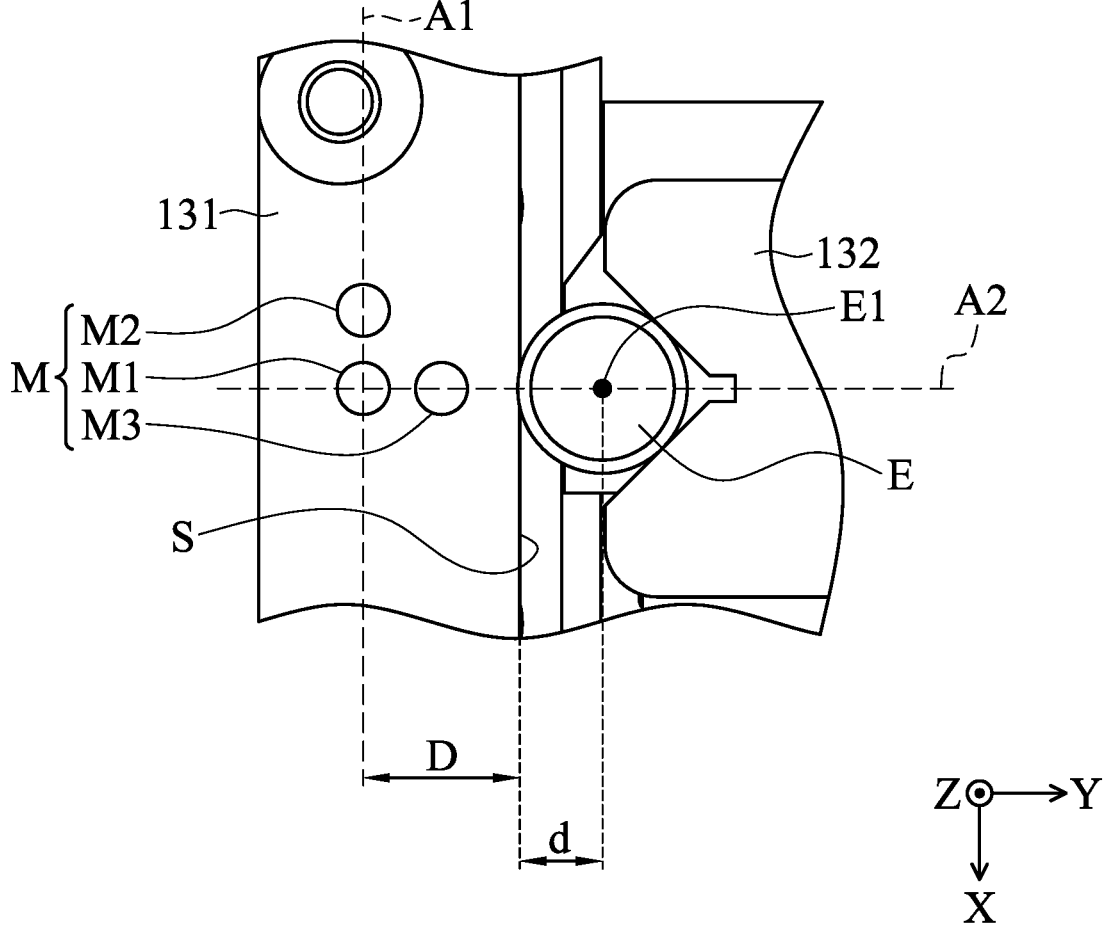
FIG. 7 is a partial enlarged view of FIG. 6, wherein a first datum axis A1 extends through the first reference feature M1 and the second reference feature M2 along the X direction, and a second datum axis A2 extends through the first reference feature M1 and the third reference feature M3 along the Y direction.

FIG. 6 is a top view of the clamping unit 13 with a visual pattern M formed on the fixed part 131. FIG. 7 is a partial enlarged view of FIG. 6, wherein a first datum axis A1 extends through the first reference feature M1 and the second reference feature M2 along the X direction, and a second datum axis A2 extends through the first reference feature M1 and the third reference feature M3 along the Y direction.

As shown in FIGS. 6 and 7, a discernable visual pattern M is formed on the fixed part 131 of the clamping unit 13, wherein the visual pattern M includes a first reference feature M1, a second reference feature M2, and a third reference feature M3.

In this embodiment, the first and second reference features M1 and M2 define a first datum axis A1, and the first and third reference features M1 and M3 define a second datum axis A2 that is perpendicular to the first datum axis A1. Specifically, a first datum axis A1 is defined and extends through the centers of the first and second reference features M1 and M2 in a first direction (X direction), and a second datum axis A2 is defined and extends through the first and third reference features M1 and M3 in a second direction (Y direction).

Here, the first and second datum axes A1 and A2 are perpendicular to each other, thus defining an orthogonal coordinate system (i.e. the second coordinate system CS2 as shown in FIG. 1). In some embodiments, the first and second datum axes A1 and A2 may be angled relative to each other (neither perpendicular to nor parallel to each other), and the invention is not limited to the embodiments described above.

It can be seen in FIG. 7 that when the gripping part 132 moves toward the fixed part 131 to hold the electronic component E in the predetermined position, the electronic component E contacts the edge S of the fixed part 131, and the second datum axis A2 extends through the first and third reference features M1, M3 and the center E1 of the electronic component E.

In this embodiment, a first distance D is formed between the first datum axis A1 and the edge S of the fixed part 131, and a second distance d is formed between the edge S of the fixed part 131 and the center E1 of the electronic component E. Here, the first datum axis A1 is parallel to the edge S of the fixed part 131, and the second datum axis A2 is perpendicular to the edge S of the fixed part 131.

It should be noted that the electronic component E is stationary relative to the visual pattern M when held between the gripping part 132 and the fixed part 131. Since the first and second distances D, d and the position of the visual pattern M (the second coordinate system CS2) relative to the first coordinate system CS1 are predetermined, the coordinate value of the electronic component E in the first coordinate system CS1 may be calculated and determined. Thus, the manipulator 30 may rapidly and precisely pick up the electronic component E and insert it into the circuit board P, so as to facilitate the high efficiency and high yield rate of the production process.

In this embodiment, the first, second, and third reference features M1, M2, and M3 are round blind holes formed on the top surface of the fixed part 131. In some embodiments, the first, second, and third reference features M1, M2, and M3 may have a triangular, polygonal or other geometric shape, and the invention is not limited to the embodiments described above.

Figure 8:
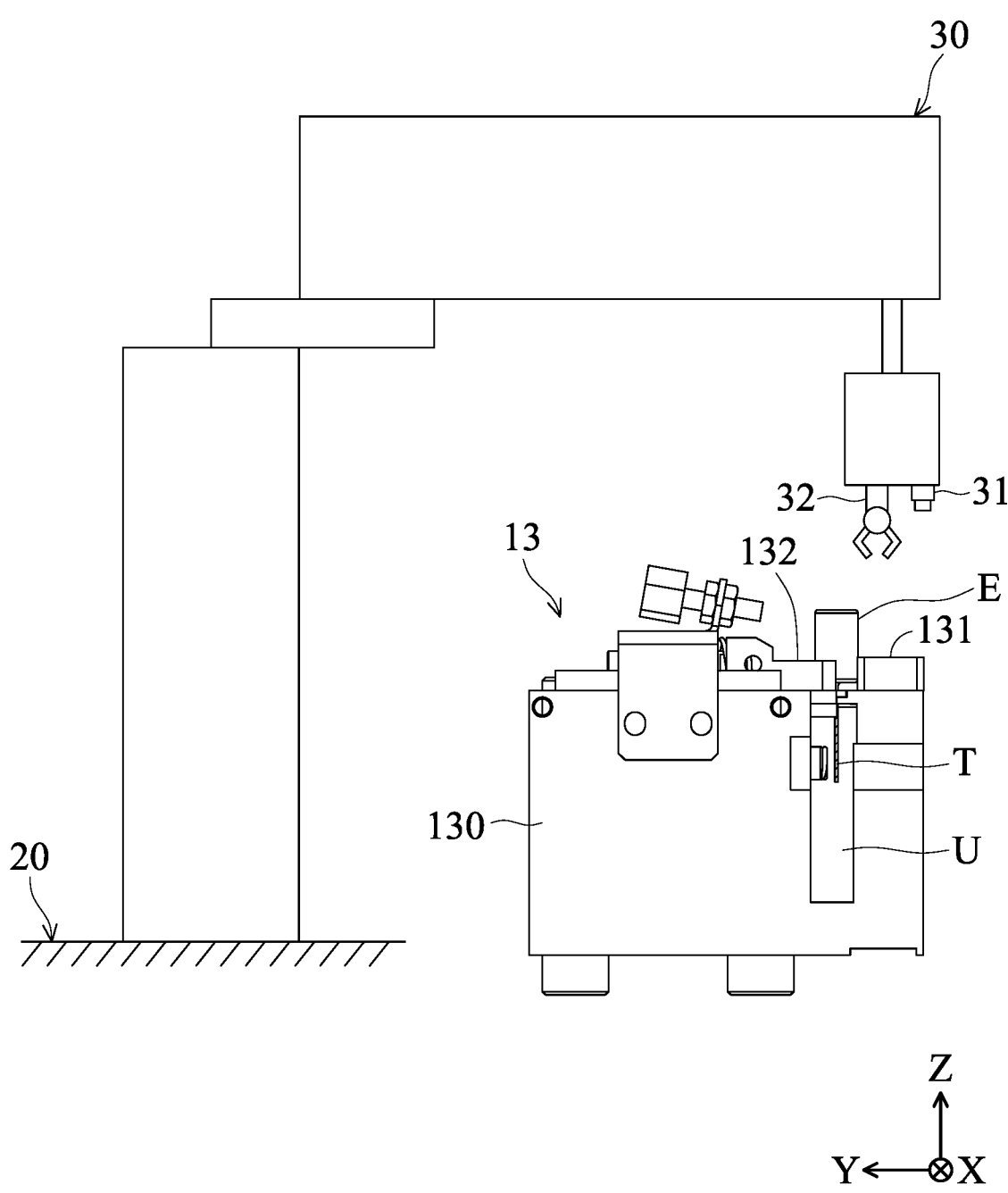
FIG. 8 is a schematic diagram showing a visual module 31 that is disposed on the manipulator 30 for capturing an image of the visual pattern M on the fixed part 131.

FIG. 8 is a schematic diagram showing a visual module 31 that is disposed on the manipulator 30 for capturing an image of the visual pattern M on the fixed part 131.

Referring to FIG. 8, during the calibration procedure of the automatic pick-and-place system 100, the manipulator 30 may move to the top of the fixed part 131 of the clamping unit 13, and the visual module 31 (e.g. camera lens) on the manipulator 30 may capture an image of the visual pattern M that is formed on the fixed part 131.

Subsequently, the visual module 31 transmits the image of the visual pattern M to the processing unit 40 (FIG. 1), wherein the visual module 31 is electrically connected to the processing unit 40. The processing unit 40 may calculate the coordinate value of the visual pattern M in the first coordinate system CS1, and then calculate and determine the coordinate value of the electronic component E in the first coordinate system CS1 based on the aforementioned information including the first and second distances D and d, thereby calibrating the automatic pick-and-place system 100.

After performing the calibration procedure of the automatic pick-and-place system 100, the coordinate value of the electronic component E in the first coordinate system CS1 may be determined. Therefore, the manipulator 30 may move to a target position accurately, and a tooling module 32 (e.g. the robotic gripping jaws shown in FIG. 8) may pick up the electronic component E and insert it into the circuit board P on the base 20.

In summary, the invention provides an automatic pick-and-place system 100, wherein a visual pattern M is formed on the fixed part 131 of the clamping unit 13, and a visual module 31 is disposed on the manipulator 30 for capturing an image of the visual pattern M. Hence, the problems of the conventional manual teach-and-learn procedure may be addressed so as to facilitate precise and stable calibration of the automatic insertion machine. Moreover, since the new calibration method using the visual module 31 is faster and more precise, the production process is more efficient and has a higher yield.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic pick-and-place system, comprising:
a feeding device, configured to move a tape and a plurality of electronic components disposed on the tape, wherein the feeding device has a base and a clamping unit disposed on the base, and the clamping unit includes a main body, a fixed part, and a gripping part, wherein the fixed part comprises a block mounted on the main body, the gripping part is movably disposed on the main body, and when the tape and one of the electronic components move to a predetermined position, the gripping part slides relative to the main body so that the electronic component is positioned between the gripping part and the fixed part;
a visual pattern, formed on a surface of the block;
a manipulator, having a visual module and a tooling module; and
a processing unit, electrically connected to the visual module, wherein the visual module captures an image of the visual pattern on the fixed part and transmits the image to the processing unit, the processing unit calculates a coordinate value of the electronic component according to the image, the manipulator moves to a target position according to the coordinate value, and the tooling module then picks up the electronic component;
wherein the visual pattern includes a first reference feature, a second reference feature, and a third reference feature, a first datum axis extends through the first reference feature and the second reference feature, and a second datum axis extends through the first reference feature and the third reference feature;
wherein the first reference feature, the second reference feature, and the third reference feature are blind holes formed on a top surface of the fixed part.

2. The automatic pick-and-place system as claimed in claim 1, wherein when the electronic component is held between the gripping part and the fixed part, the electronic component contacts an edge of the fixed part, and the first datum axis is parallel to the edge.

3. The automatic pick-and-place system as claimed in claim 2, wherein the second datum axis is perpendicular to the edge.

4. The automatic pick-and-place system as claimed in claim 3, wherein a first distance is formed between the first datum axis and the edge of the fixed part, a second distance is formed between the edge of the fixed part and the center of the electronic component, and the processing unit calculates the coordinate value of the electronic component based on the image and the first distance and the second distance.

5. The automatic pick-and-place system as claimed in claim 1, wherein the first datum axis is perpendicular to the second datum axis.

6. The automatic pick-and-place system as claimed in claim 1, wherein the second datum axis extends through the center of the electronic component.

7. The automatic pick-and-place system as claimed in claim 1, wherein the feeding device is a vertical tape feeder.

8. The automatic pick-and-place system as claimed in claim 1, wherein the first datum axis is not parallel to the second datum axis.

9. The automatic pick-and-place system as claimed in claim 1, wherein the first datum axis is perpendicular to the second datum axis.

10. The automatic pick-and-place system as claimed in claim 1, wherein the feeding device is a vertical tape feeder.

11. The automatic pick-and-place system as claimed in claim 1, wherein the first datum axis is not parallel to the second datum axis.

12. An automatic pick-and-place system, comprising:
a feeding device, configured to move a tape and a plurality of electronic components disposed on the tape, wherein the feeding device has a base and a clamping unit disposed on the base, and the clamping unit includes a main body, a fixed part, and a gripping part, wherein the fixed part comprises a block mounted on the main body, the gripping part is movably disposed on the main body, and when the tape and one of the electronic components move to a predetermined position, the gripping part slides relative to the main body so that the electronic component is positioned between the gripping part and the fixed part;

a visual pattern, formed on a surface of the block;

a manipulator, having a visual module and a tooling module; and a processing unit, electrically connected to the visual module, wherein the visual module captures an image of the visual pattern on the fixed part and transmits the image to the processing unit, the processing unit calculates a coordinate value of the electronic component according to the image, the manipulator moves to a target position according to the coordinate value, and the tooling module then picks up the electronic component;

wherein the visual pattern includes a first reference feature, a second reference feature, and a third reference feature, a first datum axis extends through the first reference feature and the second reference feature, and a second datum axis extends through the first reference feature and the third reference feature;

wherein the first reference feature, the second reference feature, and the third reference feature have a round, triangular, or polygonal shape.

13. The automatic pick-and-place system as claimed in claim 12, wherein when the electronic component is held between the gripping part and the fixed part, the electronic component contacts an edge of the fixed part, and the first datum axis is parallel to the edge.

14. The automatic pick-and-place system as claimed in claim 13, wherein the second datum axis is perpendicular to the edge.

15. The automatic pick-and-place system as claimed in claim 14, wherein a first distance is formed between the first datum axis and the edge of the fixed part, a second distance is formed between the edge of the fixed part and the center of the electronic component, and the processing unit calculates the coordinate value of the electronic component based on the image and the first distance and the second distance.

16. The automatic pick-and-place system as claimed in claim 12, wherein the second datum axis extends through the center of the electronic component.

* * * * *